United States Patent [19]

Gilliland et al.

[11] Patent Number: 5,681,365
[45] Date of Patent: Oct. 28, 1997

[54] RADIATION RESISTANT OPTICAL WAVEGUIDE FIBER

[75] Inventors: John W. Gilliland, Horseheads; Alan J. Morrow, Elmira, both of N.Y.; Kenneth Sandhage, Columbur, Ohio

[73] Assignee: Corning Incorporated, Corning, N.Y.

[21] Appl. No.: 412,489

[22] Filed: Mar. 28, 1995

Related U.S. Application Data

[62] Division of Ser. No. 272,803, Jul. 11, 1994, Pat. No. 5,509,101.

[51] Int. Cl.$^6$ .................................................. C03B 37/027
[52] U.S. Cl. ............................. 65/377; 65/381; 65/398; 65/435; 65/399
[58] Field of Search ........................... 65/377, 381, 397, 65/399, 435, 398

[56] References Cited

U.S. PATENT DOCUMENTS

| | | | |
|---|---|---|---|
| 4,579,571 | 4/1986 | Hicks | 65/397 |
| 4,692,615 | 9/1987 | Mensah | 65/381 |
| 4,969,941 | 11/1990 | Kyoto | 65/397 |
| 4,988,162 | 1/1991 | Hayami | 350/96.25 |
| 5,146,534 | 9/1992 | Lines | 385/142 |
| 5,163,987 | 11/1992 | Ishiguro et al. | 65/3.12 |
| 5,210,816 | 5/1993 | Lino et al. | 385/142 |
| 5,217,516 | 6/1993 | Ishiguro | 65/397 |
| 5,221,309 | 6/1993 | Kyoto | 65/397 |
| 5,303,318 | 4/1994 | Tateda | 65/399 |

FOREIGN PATENT DOCUMENTS

| | | | |
|---|---|---|---|
| 63-185839 | 8/1988 | Japan | 65/377 |

OTHER PUBLICATIONS

A Review of Single–Mode Fibers with Modified Dispersion Characteristics, Ainslie et al., Journal of Lightwave Technology, vol., LT–4, No. 8, Aug. 1986.

Formation of Drawing Induced E Centers in Silica Optical Fibers by Y. Hibino et al. Japanese Journal of Applied Physics, 1985.

Drawing Condition Dependence of Radiation–Induced Loss in Optical Fibers, by H. Hanafusa et al. Electronics Letters V.22, No. 2, 1986.

Influence of Preform and Draw Conditions on UV Transmission and Transient Radiation Sensitivity of an Optical Fiber by Lyons et al. Proceedings SPIE vol. 1174, Fiber Optics Reliability: Benign and Advese Environments III. 1989 Symposium.

*Primary Examiner*—John Hoffmann
*Attorney, Agent, or Firm*—William J. Chervenak

[57] ABSTRACT

A radiation resistant optical waveguide fiber doped with fluorine or drawn with low tension in the fiber. The fluorine doping is substantially constant across the core and a portion of the clad adjacent the core. The concentration of the fluorine is in the range of about 0.3 to 3.0 weight percent. The draw tension is less than or equal to about 5 grams (40 dynes/cm$^2$) to achieve optimum radiation resistance. A synergy is found when fluorine and low draw tension are applied to a fiber. Improvement in radiation resistance is largely independent of fiber type and geometry. Further improvement in radiation resistance is found when germanium is doped in a portion of the clad adjacent the core.

4 Claims, 3 Drawing Sheets

Chart Process Flow

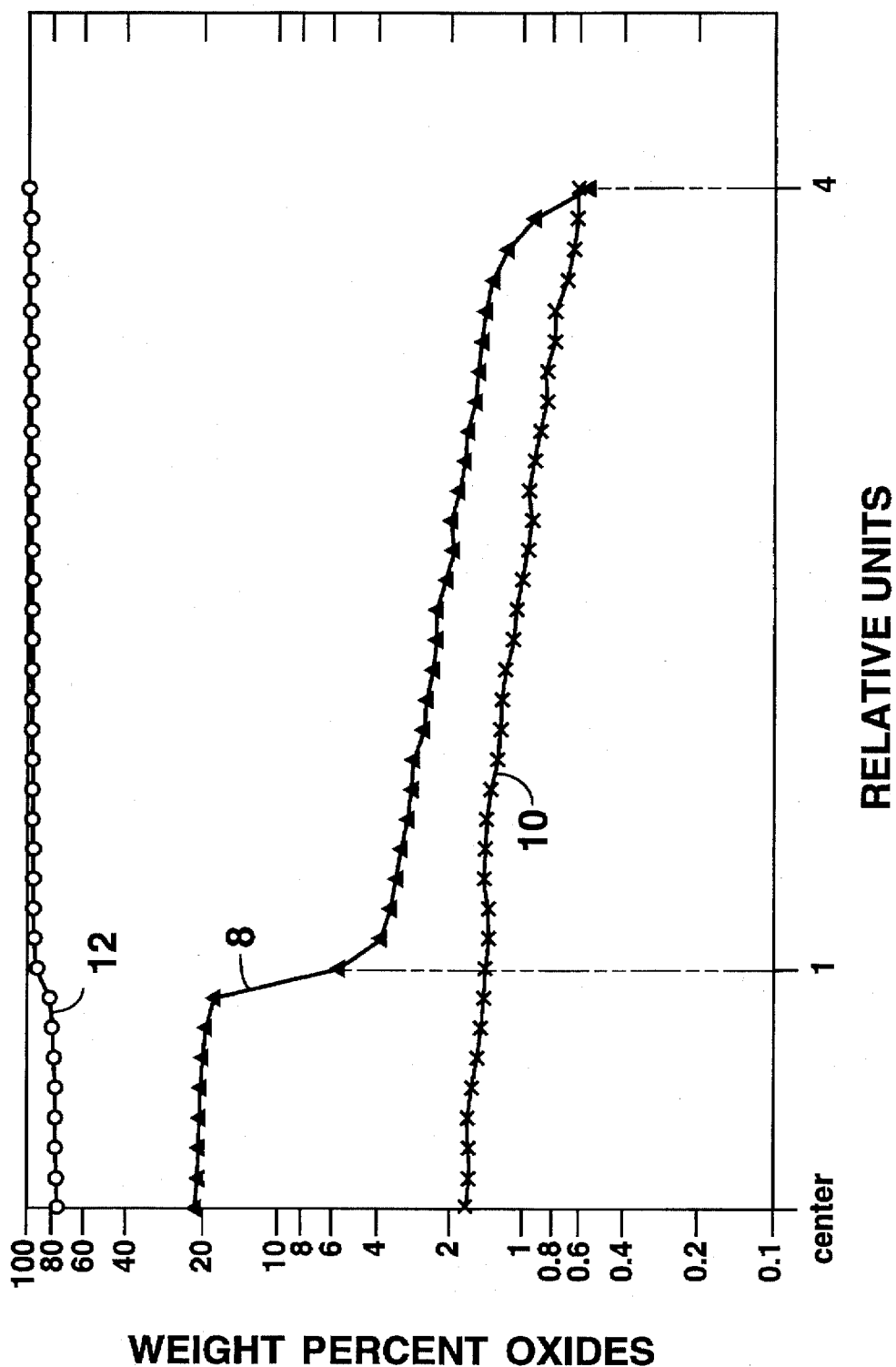

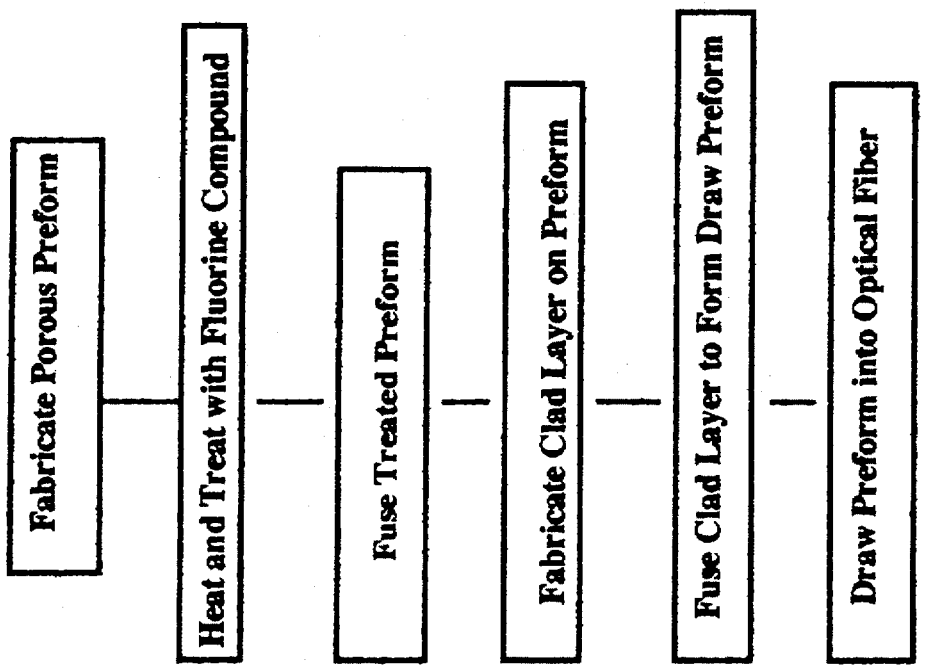

RADIATION RESISTANT OPTICAL WAVEGUIDE FIBER

This is a division of application Ser. No. 08/272,803, filed Jul. 11, 1994 now U.S. Pat. No. 5,509,101.

BACKGROUND OF THE INVENTION

This invention relates to a radiation resistant optical waveguide fiber. In particular, the invention relates to a radiation resistant optical waveguide fiber which is doped with fluorine or drawn at low tension.

The broadband capacity, dielectric properties and light weight of waveguide fiber makes it desirable for communication, data and sensing uses in military, nuclear reactor and space applications. To meet the requirements of these applications, considerable work has been done to develop a radiation resistant waveguide fiber.

The term radiation resistant, as applied to an optical waveguide, usually refers to the resistance of an optical waveguide to attenuation increase (induced attenuation) due to exposure to x-rays, gamma rays, neutrons or the like. However, radiation resistance may also refer to rate of decrease in induced attenuation after radiation exposure has ceased or to the total time required for the induced attenuation to fall to zero, or nearly to zero, after exposure has ceased. Thus, in general, radiation resistance may be defined in terms of induced attenuation, rate of recovery or time to full or partial recovery. Each of these measures of radiation resistance may be important in waveguide fiber applications where radiation is present. The term radiation resistance will, in general, be used in reference to these three measures of radiation resistance.

The measured radiation resistance of an optical waveguide fiber depends upon several variables including:
- amount and type of dopants in the fiber;
- temperature of the fiber during and after exposure;
- hydroxyl ion content of the fiber;
- interstitial hydrogen content of the fiber;
- type of radiation incident upon the fiber;
- radiation dose rate;
- total radiation dose; and
- number of separate radiation exposures experienced by the fiber.

Combining these factors with the definition of radiation resistance above, radiation resistance of a waveguide fiber may be expressed in terms of:
- total attenuation induced by a given radiation type, a given radiation dose and a given radiation dose rate at a given temperature;
- a plot of attenuation vs. time which shows the characteristic recovery, i.e., decrease in induced attenuation, after radiation exposure has ceased; and,
- time interval, after exposure has ceased, to recover to a given multiple of the pre-irradiation attenuation.

Proper evaluation of the effect on radiation resistance of a change in waveguide structure or manufacturing method, in general, requires that a reference waveguide fiber be provided as a standard of comparison. The reference waveguide fiber is essentially identical to the test fiber in terms of composition, dimensions, refractive index profile and manufacturing method. Except for the exposure to radiation, the reference fiber is maintained in essentially the same environment as a test fiber and measured each time the test fiber is measured.

Radiation of sufficiently high energy incident on a waveguide fiber is believed to break or ionize bonds (produce defects) in the glass waveguide fiber structure. These defects can absorb or scatter light traversing the waveguide thereby increasing the waveguide attenuation. Further, it is believed a waveguide fiber which has defects in bond structure is more susceptible to ionizing radiation and is more likely to retain structural damage done by ionizing radiation. Hence, efforts to produce a radiation resistant waveguide fiber have been directed to:

i) producing a fiber from materials which form strong bonds;

ii) producing a fiber which is low in defect concentration.

Y. Hibino, et al., "Formation of Drawing-Induced E' Centers in Silica Optical Fibers," Japanese Journal of Applied Physics, 1985, reported increase in the E' defect centers with increasing draw temperature and with increasing draw speed.

The reported results do not appear to relate draw tension to the formation of E' defects. Increased temperature usually implies lower draw tension. And increased draw speed usually implies higher draw tension. Yet both increased draw speed and increased temperature result in a greater number of E' centers.

The work of H. Hanafusa, et al., "Drawing Condition Dependence of Radiation-Induced Loss in Optical Fibers", Electronics Letters, V. 22, No. 2, 1986, showed recovery of the irradiated fiber, one day after exposure, worsened as fiber draw speed decreased from 14.3 m/sec to 2 m/sec. However, recovery improved as fiber draw temperature increased from 2000° to 2255° C.

Here again the data is not consistent with regard to predicting improved radiation resistance under low or high draw tension conditions.

The work of Lyons, et al., "Influence of Preform and Draw Conditions on UV Transmission and Transient Radiation Sensitivity of an Optical Fiber", Proceedings SPIE, Vol. 1174, Fiber Optics Reliability: Benign and Adverse Environments III, 1989 Symposium, dealt with transient response of fiber attenuation irradiated with high energy x-ray pulses, $Co^{60}$ and UV light. Draw tension was varied between 12 and 185 grams (96 and 1480 Mdynes/cm$^2$ for a 125 micron O.D. fiber). The transient response was reported to be improved with lower draw tension. However, the data does not consistently show that low draw tension provided improved radiation resistance. In their conclusion statement, low draw tension is not recognized as a key variable in producing radiation resistant fiber. "Very low draw speeds, even though they minimize draw tension, do not provide optimized UV and $Co^{60}$ performance independent of the fiber buffer material. . . . Intermediate draw speeds provide optimum performance." (p. 18, para. 4.) Also draw tensions below 12 grams (96 Mdynes/cm$^2$) were not investigated.

Askins, et at., reported the effect on long term recovery of draw tension in the range 20 to 80 grams (160 and 640 Mdynes/cm$^2$ for a 125 micron O.D. fiber). No correlation was reported. These workers did report, "at some tension higher than 50 grams, the initial loss (measured immediately after irradiation) increases sharply." No systematic investigation of the effect of low draw tension was reported.

U.S. Pat. No. 4,988,162, Hayami, relates to a radiation resistant multiple fiber, "wherein a number of optical fiber elements each of which comprises a core composed of a pure silica glass and a cladding layer formed on the core and composed of a doped silica glass are mutually heat fused, and said pure silica glass of the core having a chlorine content of lower than 1 ppm, an OH group content of lower than 1000 ppm, and also fluorine content of at least 100 ppm." (Col. 1, ll. 38–45.)

The limitations of this structure are:

i) no co-dopant in the core restricts the number of attainable shapes of the index profile; and, ii) higher OH ion concentration results in higher waveguide attenuation at wavelengths near the characteristic OH absorption peaks.

The attainable profiles are also limited in U.S. Pat. No. 5,163,987, Ishiguro et at., which relates to, "a method for producing a glass preform for use in the fabrication of an optical fiber, in which fluorine is homogeneously added." (Col. 2, ll. 42–45.)

U.S. Pat. No. 5,146,534, Lines, is directed to a structure which incorporates certain alkali metals and fluorine in the core. "The alkalis that can produce such loss [intrinsic attenuation] reductions are Na, K and Rb. I have also discovered that co-doping with F can significantly extend the concentration range in which doping with K and Rb can yield loss reduction." (Col. 2, ll. 23–27.)

Here again the specified structure is limited in the index profiles it can produce. Also, the addition of alkali metals to the core may not be expected to improve radiation resistance.

U.S. Pat. No. 5,210,816, Iino et al., is directed to a waveguide fiber. ". . . characterized in that at least the core portion is doped with fluorine and an oxide and in that the fluorine contained in the core portion is doped more toward the center in the radial direction than the outer circumferencial portion." col. 1, ll. 66–68, col. 2, ll. 1–2.

The fluorine is used to yield a step index profile in light of a processing phenomenon in which the core oxide diffuses out of the core during a preform processing step. See col. 1, ll. 39–47. The fluorine doping is non-uniform to compensate for the non-uniformity of the core oxide diffusion.

The prior art does not define drawing parameters which consistently improve radiation resistance regardless of the waveguide fiber composition. Also, the effect of co-doping with fluorine has not been fully explored and understood. Furthermore, potential advantageous interaction between fluorine co-doping and drawing conditions has not been thoroughly studied.

SUMMARY OF THE INVENTION

Definition of Tension

Common usage in the art is to give tension in grams. To express tension as a force, the tension in grams is multiplied by 980 cm/sec$^2$, the acceleration due to gravity. Also, to interpret the effect of the tension on a fiber being drawn, the area of the fiber should be taken into account. Throughout this application, the tension in grams will be followed by the force/unit area expressed in Mdynes/cm$^2$ in parentheses.

The present invention meets the need for a waveguide fiber having improved radiation resistance and provides a method of making a waveguide fiber having improved radiation resistance which is substantially independent of waveguide fiber type. The method is effective for multimode and singlemode optical waveguides and for fibers having germania doped core regions.

The invention is an improved radiation resistant waveguide fiber and a method of making an improved radiation resistant fiber independent of radiation type. The improvement is found in the inventive waveguide fiber using any of the above three definitions of radiation resistance.

A first aspect of the present invention is a radiation resistant optical waveguide fiber wherein the core region and a portion of the clad layer adjacent the core are doped with fluorine. The fluorine concentration profile, expressed in percent by weight, is held substantially constant in the radial direction proceeding outward from the core. Over the fluorine doped region, the ratio of maximum to minimum fluorine concentration is less than or equal to three. In a preferred embodiment of the invention, fluorine concentration is in the range of about 0.3 to 3.0% by weight. The core or clad portions of the waveguide fiber may contain other dopants such as germanium. In a preferred embodiment, a portion of the clad adjacent the core is doped with germanium in the range of about 0.5 to 5.0% by weight wherein the germanium profile is substantially flat. For a fiber having a germania doped core, fluorine is co-doped with the germania. Fluorine and germania co-doping is also done in a portion of the clad layer adjacent the core.

A further aspect of the invention is a method of making a radiation resistant optical waveguide fiber comprising the steps of fabricating a porous glass preform, where the inner region of the preform corresponds to the waveguide core and an annular layer adjacent the core, corresponds to a portion of the clad. The porous preform is heated in the presence of fluorine or a gaseous fluorine compound to incorporate fluorine into the preform. In a preferred embodiment of the method, the fluorine compound is SiF$_4$. The preform is fused to form a glass body. A cladding layer is added to the fused glass body to form a draw preform. The draw preform is heated and drawn into optical waveguide fiber. Drawing is done with the tension in the waveguide fiber maintained less than or equal to 5 grams (40 Mdynes/cm$^2$). The draw preform may be made by any of the methods known in the art including MCVD, OVD or VAD. Depending upon the method used, a preform stretching step followed by a cladding step or a step involving insertion of a fluorine doped glass rod in a tube of clad glass may be included. FIG. 3 is a flow chart of the process steps given above.

Another aspect of the invention is an optical waveguide fiber made by a process wherein the drawing step is carried out at a waveguide fiber tension less than or equal to 5 grams (40 Mdynes/cm$^2$). The waveguide fiber manufactured at this draw tension exhibits improved radiation resistance. However no measurable structural characteristics have been found which distinguish a fiber drawn at a tension below 5 grams (40 Mdynes/cm$^2$) from a fiber drawn at higher tension. In a preferred embodiment the radiation resistant waveguide fiber has a core and an annular layer of clad adjacent the core doped with fluorine and is drawn at a tension less than or equal to 5 grams (40 Mdynes/cm$^2$). The preferred fluorine profile is radially uniform and has a concentration in the range 0.3% to 3.0% by weight.

BRIEF DESCRIPTION OF THE DRAWINGS

FIG. 2 shows typical concentration profiles of the materials which comprise an embodiment of the inventive waveguide fiber.

FIG. 3 is a flow chart of the steps of making a glass preform and drawing optical fiber therefrom.

DETAILED DESCRIPTION OF THE INVENTION

Figure 1:
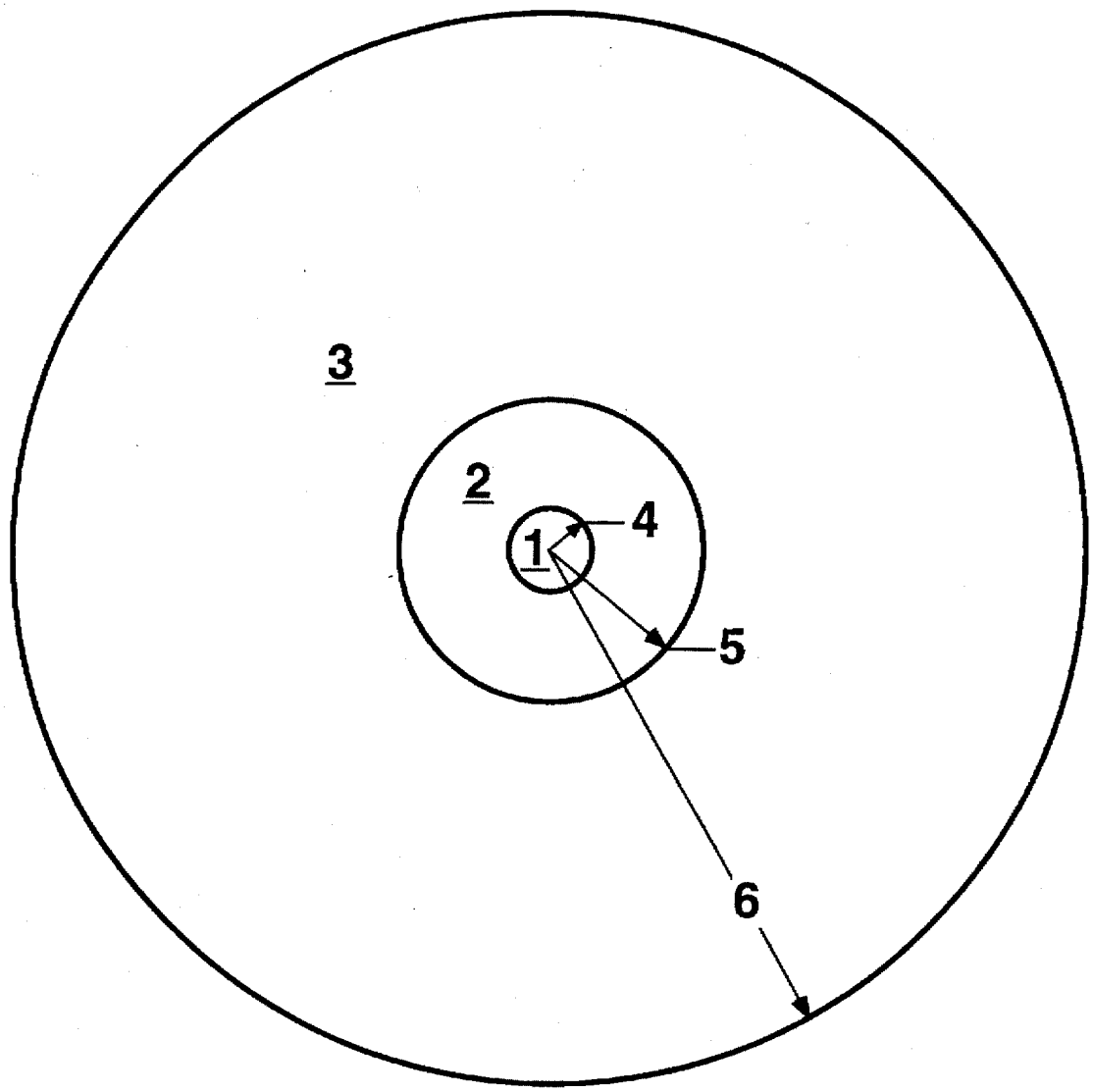
FIG. 1 is a cross section of the inventive waveguide fiber showing the regions in the fiber which are distinctively doped.

It will be understood that the drawings are intended to aid in the description of embodiments of the invention. The drawings are not necessarily to scale.

FIG. 1 is a cross section of the inventive waveguide showing the core region 1 having radius 4, an annular clad layer 2 adjacent the core having inner radius 4 and outer radius 5 and the remainder of the clad 3 having inner radius 5 and outer radius 6.

In one embodiment of the invention, the core region is a silica glass doped with germanium and co-doped with fluorine, the fluorine concentration being essentially constant over the core region and having a weight percent in the range of about 0.3 to 3.0. The surrounding clad area, beginning at radius 4 and ending at radius 6, is silica.

In another embodiment of the invention, the core region is a silica glass doped with germanium and co-doped with fluorine having substantially the same fluorine profile as in the embodiment immediately above. This fluorine profile extends through the adjacent clad region 2. That is, the essentially constant fluorine concentration profile extends from the waveguide fiber center to the radius 5. The remainder of the clad, region 3, is a silica glass.

In a preferred embodiment of the invention, core region 1 is doped with germanium and co-doped with fluorine and adjacent clad layer 2 is doped with fluorine as in the embodiment immediately above. In addition, clad layer 2 is doped with germanium having a profile which is essentially flat and a concentration which is in the range of 0.5 to 5.0 weight percent.

This preferred embodiment is further illustrated by the concentration profiles of FIG. 2. In FIG. 2, the horizontal axis is radial distance beginning at the fiber center. The vertical axis is in units of weight percent. Line 8 shows the weight percent germania in the core region, which extends to the distance labelled 1 on the horizontal axis. The continuation of line 8 from horizontal distance 1 to distance 4 represents the germania concentration in the clad layer adjacent the core. It will be understood that line 8 represents a family of germania profiles wherein the core concentration of germania may be higher or lower than shown, i.e. in the range of about 5 to 50 weight percent. Also, the clad concentration of germania is higher or lower in proportion to the core concentration and generally is in the range of about 0.5 to 5.0 weight percent. For the case shown the average core concentration of germania is about 22% and the average clad concentration is about 2%.

Line 10 shows the fluorine concentration beginning at the center line of the waveguide fiber and ending at the outer edge of the adjacent clad layer. The fluorine concentration as shown is about 1.9% on centerline and about 0.7% at the outer edge of the adjacent clad region. However, radiation resistance is improved by fluorine concentrations in the range 0.3 to 3.0%. A preferred fluorine profile in a radiation resistant waveguide is flat or at least has a ratio of maximum to minimum fluorine concentration less than or equal to about 3.

Line 12 of FIG. 2 shows the weight percent silica in the waveguide fiber along a radius extending to the outer edge of the adjacent clad region.

The mechanism by which the addition of fluorine and germania in the core region or adjacent clad region improves radiation resistance is not well understood. A plausible explanation of the improved radiation resistance may be as follows.

Radiation incident upon the waveguide fiber ionizes certain of the atoms in the glass. Defect sites present in the glass may trap the electrons freed in the ionization. The trapped electrons may absorb light propagating in the waveguide fiber and so increase the fiber attenuation. The presence of fluorine or germania in the light carrying part of the waveguide fiber may act to decrease the number of defects capable of trapping a free electron. Alternatively, the defect site may be altered by the presence of fluorine or germania so that a trapped electron will not absorb light in the wavelength range being propagated.

Other steps may be taken to reduce the number and type of defects present in a waveguide fiber. In particular, the drawing step may be carried out under conditions which result in waveguide fiber having a minimum number of defects. Typically in the drawing step the diameter of the draw preform is reduced by a factor of several thousand. In the course of this size reduction, many bonds in the glass must break and reform. Thus there may exist optimum drawing conditions which allow a maximum number of bonds to reform and thereby produce a waveguide fiber with a minimum of defects.

The tension in the waveguide fiber during drawing is a measure of the stress in the fiber while the broken bonds are reforming. Thus a reduction in draw tension may be expected to reduce the number of defects in the finished waveguide fiber.

The following examples will serve to show preferred embodiments of the invention and to illustrate the improvement in radiation resistance of a waveguide fiber which results from:

a) the addition of fluorine to the core and an adjacent portion of the clad;

b) the co-doping of fluorine and germanium in a portion of the clad adjacent the core;

c) maintaining draw tension less than or equal to 5 grams (40 Mdynes/cm$^2$); and d) combining the low draw tension ($\leq$5 grams (40 Mdynes/cm$^2$)) with either of the fluorine or fluorine-germanium doping regimens detailed above and explicitly noted in a) and b) immediately above.

EXAMPLE 1

Fluorine Doping in the Core and a Portion of the Clad Adjacent the Core

Thirteen draw preforms were prepared for drawing into single mode, step index waveguide fiber. Five of the preforms were doped with germanium in core and five fibers, one from each preform, were drawn to serve as a basis for comparison in the radiation testing. The remaining eight preforms were doped with germanium and fluorine as described below and eight fibers, one from each preform, were drawn. The fiber had an outside diameter of 125 microns and a core diameter of about 6 microns. The core region of all the fibers was doped with germanium at a concentration of about 20 weight percent. For the fluorine doped fibers, fluorine was incorporated into the core region and an annular clad region, adjacent the core. The fluorine doping was centered on the core and extended to a radius of about 12 microns. The fluorine concentration was about 2% by weight at the waveguide fiber center and decreased to about 1% at the edge of the fluorine doped region. The average ratio of maximum to minimum value of fluorine concentration was about 1.8. All of the fibers were drawn at a tension of 15 grams (120 Mdynes/cm$^2$). Thus the table of induced attenuation is indicative of the improved radiation resistance due to fluorine doping alone.

Five random segments of non-fluorine doped comparison fiber was selected for radiation testing. Eight random segments of fluorine doped fiber was selected for radiation testing. The waveguide fiber segments were between 52 and 113 meters in length. Each segment was formed into a coil, equilibrated at a temperature of about −30 °C. and irradiated with Co⁶⁰ gamma rays. The dose rate was about 100 rads/sec and the total dose was 1700 rads. Attenuation of each coiled segment was measured before, during and after the irradiation. The attenuation increase caused by the radiation, i.e., the induced attenuation, is shown in Table 1. The peak induced attenuation as well as the attenuation at 15 and 30 minutes after irradiation are shown. Attenuation was measured at 1300 nm wavelength.

TABLE 1

| Fiber Type | Peak Induced Att. @ 1300 nm dB/km | Induced Att. @ 1300 nm 15 Minutes after Irradiation dB/km | Induced Att. @ 1300 nm 30 Minutes after Irradiation dB/km |
| --- | --- | --- | --- |
| Non Fluorine Base Case | 9.57 | 3.46 | 2.91 |
| Fluorine Doped Fiber | 3.38 | 1.01 | 0.81 |

The fluorine doped waveguide fiber performed better than the base case, comparison fiber by about a factor of three.

EXAMPLE 2

Fluorine Doping Together with Germanium Doping in the Clad Region Adjacent the Core Ten single mode, step index fibers were prepared from ten draw preforms. Six of the fibers were used as comparison fibers and contained fluorine as in example 1 but no germanium in the clad region. Four fibers contained fluorine as described in example 1 and germanium in the clad region containing fluorine. The germanium concentration is shown in Table 2.

Each fiber was prepared and irradiated as in example 1, except that the dose rate was about 110 rads/sec and the total dose was 1440 rads for four comparison fibers and two fibers having germanium in the clad. Two comparison fibers and two fibers having germanium in the clad received a total dose of 1440 or 1700 rads as shown in Table 2. The temperature during irradiation was −32° C. The induced attenuation data in Table 2 was taken immediately after irradiation, i.e. t=0 in the table, fifteen minutes after irradiation and 30 minutes after irradiation. The induced attenuation data is the average for the fibers in each category. Each individual fiber followed the trend shown in Table 2. Attenuation was measured at 1300 nm wavelength.

TABLE 2

| Fiber Type | GeO₂ wt. % | Peak Induced Att. t = 0 | Induced Att. t = 15 min. | Induced Att. t = 30 min. |
| --- | --- | --- | --- | --- |
| Fluorine Doping 1440 Rads | 0 | 3.04 | 0.94 | 0.73 |
| Fluorine Doping 1440 Rads | 0.5 | 3.24 | 0.94 | 0.81 |
| Fluorine Doping 1440 Rads | 1.3 | 1.8 | 0.31 | 0.21 |
| Fluorine Doping 1700 Rads | 0 | 5.49 | 2.00 | 1.62 |
| Fluorine Doping 1700 Rads | 0.7 | 2.56 | 0.65 | 0.54 |
| Fluorine Doping 1700 Rads | 2.2 | 2.36 | 0.49 | 0.31 |

The data point at 1440 rads with 0.5 weight percent germania indicates that a weight percent of germania greater than about 0.5 is needed to achieve the desired improvement in radiation resistance. Note that at the higher dose rate, 0.7 weight percent is effective to achieve improved radiation resistance. Thus germania in the range of about 0.5 to 5 weight percent is expected to yield the desired radiation improvement. The upper limit on germania is determined by the required index difference between core and clad rather than the requirement of radiation resistance.

EXAMPLE 3

Radiation Resistant Waveguide Fiber Made Using Lower Draw Tension

Fifteen single mode step index fibers were drawn from five draw preforms. Three fibers were drawn from each draw preform at three draw tensions, 3 grams, 15 grams and 60 grams (24, 120 and 480 Mdynes/cm²) respectively. The fibers contained no germanium in the clad and no fluorine.

Samples from each of the fifteen fibers were prepared and irradiated as in example 1. For each draw tension, the peak induced attenuation, the induced attenuation fifteen minutes after irradiation and thirty minutes after irradiation was measured at 1300 nm wavelength.

TABLE 3

| | T = 3 grams | T = 15 grams | T = 60 grams |
| --- | --- | --- | --- |
| Peak Induced Att. | 6.75 | 9.57 | 12.07 |
| Induced Att. after 15 min | 2.5 | 3.46 | 3.97 |
| Induced Att. after 30 min. | 2.11 | 2.91 | 3.63 |

Note that the fibers drawn at low tension had lower peak induced attenuation and recovered faster after irradiation than fibers drawn at higher tensions. The trend with draw tension shown in Table 3. indicates strongly that any reduction in draw tension should give improved radiation resistance. In practice, however, improvement in radiation resistance is believed to begin at tensions below about 30 grams (240 Mdynes/cm²), with greatest benefit achieved at tensions below about 5 grams (40 Mdynes/cm²).

EXAMPLE 4

Radiation Resistant Waveguide Fiber Made Using Low Draw Tension and Fluorine in the Core and in a Portion of the Clad Adjacent the Core Additional fiber was drawn from the thirteen preforms of example 1. From each of five draw preforms having no fluorine, fibers were drawn at tensions of 3 grams, 15 grams and 60 grams respectively. These 15 fibers provided the comparison basis to determine improvement in radiation resistance of the fluorine doped fibers. From each of eight draw preforms, containing fluorine as described in example 1, waveguide fibers were drawn at tensions of 3 grams, 15 grams and 60 grams (24, 120 and 480 Mdynes/cm²) respectively. The waveguide fibers were step index single mode fibers as described in example 1.

The 24 fluorine containing fibers and the 15 comparison fibers were irradiated as described in example 1. The average induced attenuation peak and the induced attenuation 15 minutes and 30 minutes after irradiation, respectively, measured at 1300 nm wavelength, are shown in Table 4.

TABLE 4

| Fiber Type/ Measurement Time | T = 3 grams | T = 15 grams | T = 60 grams |
| --- | --- | --- | --- |
| No F/Peak | 6.75 | 9.57 | 12.07 |
| F/Peak | 2.71 | 3.38 | 7.07 |
| No F/15 min | 2.5 | 3.46 | 3.97 |
| F/15 min | 0.88 | 1.01 | 1.7 |
| No F/30 min | 2.11 | 2.91 | 3.63 |
| F/30 min | 0.96 | 0.81 | 1.49 |

The trend toward lower induced attenuation at lower tension and with fluorine doping is clear. Table 4. shows the synergy between the presence of fluorine and low tension draw.

Although no formal study was done to quantify the effect of adding germanium to the fluorine doped clad portion together with reduced draw tension, it is believed that such an addition would produce a further improvement in radiation resistance.

The effect of low tension and the addition of fluorine pertains to the defect level in the glass. Thus, the improvement in radiation resistance due to fluorine addition and low draw tension is expected to be independent of the fiber type and fiber geometry. The following examples demonstrate this independence.

EXAMPLE 5

Multimode Fiber Drawn at low Tension

Ten multimode fibers were drawn from five draw preforms. Five fibers were drawn at 3 grams (24 Mdynes/cm$^2$) tension and five fibers at 15 grams tension (120 Mdynes/cm$^2$). Each fiber had a nominal core and clad diameter of 50 microns and 125 microns respectively. The core was doped with germanium to give an N.A. of about 0.23.

Each fiber was wound into a six inch coil of length between 200 and 500 meters. The ten fibers received 3800 rads of x-rays at room temperature from a 250 KV copper K-alpha source.

The averages of peak induced attenuations showed that the fibers drawn at 3 grams (24 Mdynes/cm$^2$) tension were 1.83 dB/km lower than the peak induced attenuation for the fibers drawn at 15 grams (120 Mdynes/cm$^2$) tension.

EXAMPLE 6

Multimode Fiber Containing Fluorine in the Core Region and Drawn at Low Tension

Twelve fibers were drawn from six multimode draw preforms. Six fibers were drawn at 3 grams (24 Mdynes/cm$^2$) tension and six fibers at 15 grams (120 Mdynes/cm$^2$) tension. The twelve waveguide fibers were substantially identical to those of example 5 except for the addition of fluorine in the core region and, for two blanks, a portion of the clad region. The fluorine doped clad region was an annulus adjacent the core of width about 18 microns. (The effect of fluorine in the clad region was negligible as would be expected for a fiber in which the propagating light is confined essentially to the core region.) The fluorine concentration at the fiber center was in the range of about 1.0 to 1.5 weight percent.

The fibers were irradiated as described in example 5. The average reduction in peak induced attenuation of the fluorine doped low tension fibers compared to the fluorine doped high tension fibers was measured to be 3.16 dB/km.

The data shows the positive impact of fluorine and low tension and the synergy between the two in improving radiation resistance of waveguide fiber. The doping of fluorine into the clad region does not appear to be as effective for improved radiation resistance in multimode as compared to singlemode waveguide fiber. This observation may be due to the larger percent confinement of the propagated light to the core region in multimode fiber.

Although specific embodiments of the invention have hereinbefore been disclosed and described, it will be understood that the scope of my invention is nevertheless to be defined by the following claims.

What is claimed is:

1. A method of making a radiation resistant optical waveguide, having a core region and a surrounding cladding glass layer, comprising the steps:

fabricating a porous glass preform, wherein an inner cylindrical region of said preform corresponds to said core region and an annular region surrounding and adjacent to said inner cylindrical region corresponds to an inner part of said cladding glass layer;

heating said porous preform in the presence of a gaseous fluorine compound, thereby incorporating fluorine into said preform, the fluorine concentration being radially symmetrical in said preform and the ratio of the maximum concentration of fluorine to the minimum concentration of fluorine through said inner cylindrical region and said annular region of said preform is no greater than three;

fusing said porous preform into a solid glass body;

depositing on said solid glass body a porous outer part of said cladding glass layer, said inner and outer parts together making up said cladding glass layer;

fusing said outer part of said cladding glass layer to form a draw preform; and, drawing said draw preform into an optical waveguide fiber, wherein the tension in said waveguide fiber during drawing is less than or equal to five grams;

said optical waveguide fiber being radiation resistant relative to a comparison optical waveguide which is identical to said radiation resistant optical waveguide fiber except that said comparison optical waveguide is free of fluorine and drawn at a tension greater than 5 grams.

2. The method of claim 1, wherein said gaseous fluorine compound is $SiF_4$.

3. The method of claim 1 wherein said core region is doped with germanium.

4. The method of claim 3 wherein said inner part of said cladding glass layer is doped with germanium.

* * * * *